No. 615,883. Patented Dec. 13, 1898.
A. W. NELSON.
LOOSE PULLEY AND MEANS FOR ATTACHING SAME TO SHAFTS.
(Application filed Aug. 15, 1898.)
(No Model.)
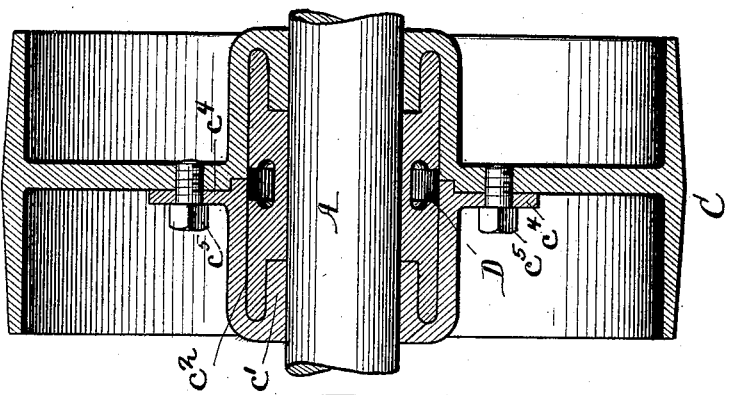
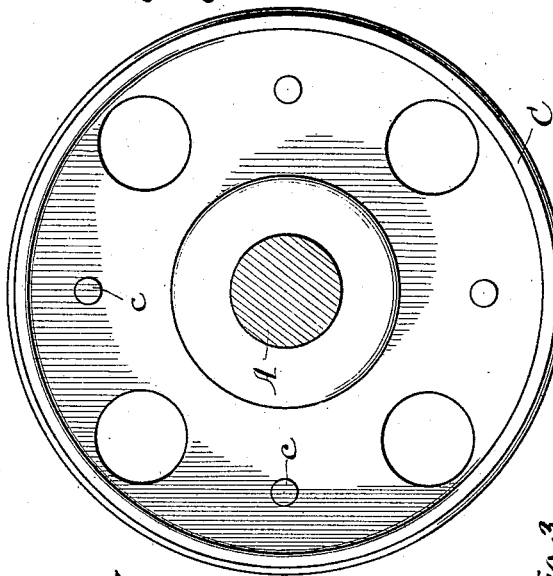
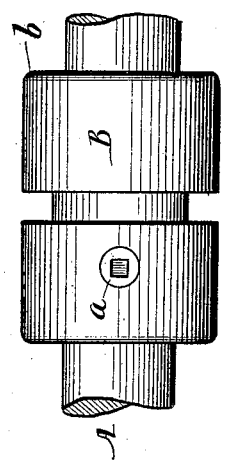
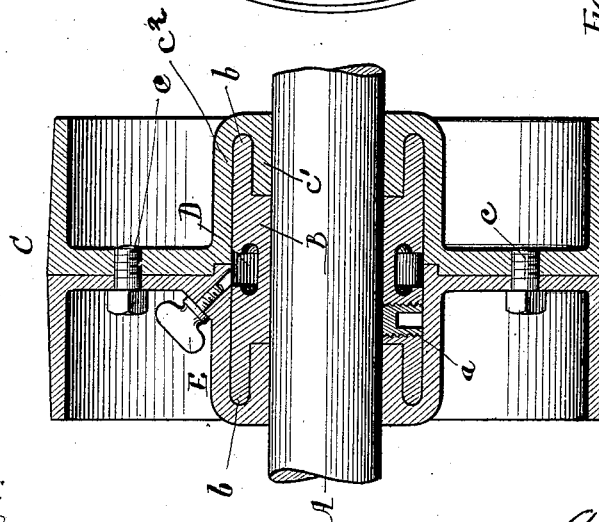
Witnesses:
Inventor:
A. W. Nelson
By Peirce & Fisher
Attorneys.

UNITED STATES PATENT OFFICE.

ARTHUR W. NELSON, OF CHICAGO, ILLINOIS.

LOOSE PULLEY AND MEANS FOR ATTACHING SAME TO SHAFTS.

SPECIFICATION forming part of Letters Patent No. 615,883, dated December 13, 1898.

Application filed August 15, 1898. Serial No. 688,611. (No model.)

*To all whom it may concern:*

Be it known that I, ARTHUR W. NELSON, a resident of Chicago, in the county of Cook, State of Illinois, have invented certain new and useful Improvements in Loose Pulleys and Means for Attaching the Same to Shafts, of which I do declare the following to be a full, clear, and exact description.

In the use of loose pulleys, idle-gears, or the like it is found in practice that the free turning of the pulley-hub upon the shaft speedily wears the shaft and the hub of the pulley. For this reason it is desirable that as great a bearing or wearing surface as possible should be given to the pulley-hub, so that the strain and consequent wear being distributed over a larger surface will be less per square inch upon the wearing parts.

This invention has for its object primarily to so construct a loose pulley or like wheel and the means whereby it is attached to the shaft that a largely-increased wearing or bearing surface shall be provided for the pulley.

While I have illustrated my invention as applied to a loose pulley, it will be manifest that the invention can be applied in connection with other wheels, such as idle-gears or sprocket-wheels or the like, and I do not therefore wish the invention to be understood as restricted to loose pulleys alone.

The invention consists in the features of improvement hereinafter described, illustrated in the accompanying drawings, and particularly pointed out in the claims at the end of this specification.

Figure 1 is a view in central vertical section through a loose pulley embodying my invention. Fig. 2 is a side view. Fig. 3 is a detail plan view of the bearing-sleeve mounted upon the shaft. Fig. 4 is a view similar to Fig. 1, but showing a slight modification.

Referring to Fig. 1, A designates the shaft, and B denotes the bearing-sleeve, that is fixed to the shaft in any convenient manner—as, for example, by the set-screw $a$ shown in the drawings. The bearing-sleeve B is preferably formed as a single casting, the central portion being of sufficient size to fit the shaft A, while the end portions are reduced in thickness, as shown, to form the annular axial flanges $b$. The pulley C is shown as formed of sections conveniently connected together, as by the bolts $c$, and each of the sections of the pulley-hub (in the construction shown in Fig. 1) is formed with an inwardly-extending flanged portion $c'$ and with a chambered portion $c^2$, adapted to receive the corresponding end portions of the bearing-sleeve B. It will thus be seen that when the pulley-sections are set upon the shaft and upon the bearing-sleeve, as shown in Fig. 1 of the drawings, the hub of the pulley will bear upon the entire periphery of the fixed bearing-sleeve B, while the inwardly-extending flanged portions $c'$ of the pulley will bear upon the shaft A at one point and upon the end portions of the bearing-sleeve B. Hence it will be seen that a very materially increased bearing-surface for the pulley is afforded.

Around the outer face of the bearing-sleeve B is formed an oil-chamber D, to which oil will be delivered through a suitable hole formed in one of the sections of the pulley, this hole being shown in Fig. 1 of the drawings as closed by a plug E. It will be seen that oil from the chamber D will flow thence around the outer surface of the bearing-sleeve B, and thence onto the shaft A, and in this manner will serve to effectively lubricate all the wearing-surfaces of the pulley. It will be understood, of course, that a sheet of paper, cardboard, or like material will be interposed between the pulley-sections at the time they are bolted together in order to prevent the leakage of oil at such joint.

In the modified form of pulley shown in Fig. 4 the body of the pulley is formed of a single piece, but the hub portion of the pulley is formed of sections. One of the sections of the pulley-hub is provided with a flange $c^4$, through which pass suitable bolts $c^5$, whereby this section of the pulley-hub is attached to the web of the pulley.

Changes in the details of construction above set out may be made by the skilled mechanic without departing from the spirit of the invention. Thus, for example, I do not regard it as essential that the inwardly-turned flange portions $c'$ of the pulley-hub should be formed integral with the body of the hub, since in some instances it is found convenient to form these flanges and the end portions of the hub of separate plates bolted to the body of the hub.

Having thus described my invention, what I claim as new, and desire to secure by Letters Patent, is—

1. A loose pulley or wheel having its hub provided with inwardly-extending flanged end portions in combination with a fixed sleeve having extensions that fit between and bear against the body of the hub and said flanged end portions.

2. A loose pulley or wheel having its hub provided at its ends with inwardly-extending axial flanges formed with bearing-faces on both sides, and a bearing-sleeve adapted to be fixed to a shaft, said bearing-sleeve having at its ends axial extensions that fit between the body of the hub and its inwardly-extending flanges.

3. A two-part pulley or wheel having its hub divided radially, each section of said hub being formed with an inwardly-extending annular flange at its outer end, in combination with the bearing-sleeve having annular flanged ends or extensions that set between the annular flanged ends of the hub and the body of said hub.

ARTHUR W. NELSON.

Witnesses:
GEO. P. FISHER, Jr.,
ALBERTA ADAMICK.